(12) United States Patent
Maier et al.

(10) Patent No.: US 10,778,553 B1
(45) Date of Patent: Sep. 15, 2020

(54) JITTER DETERMINATION METHOD AND MEASUREMENT INSTRUMENT

(71) Applicant: Rohde & Schwarz GmbH & Co. KG, Munich (DE)

(72) Inventors: Andreas Maier, Munich (DE); Bendix Koopmann, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/398,769

(22) Filed: Apr. 30, 2019

(51) Int. Cl.
*H04L 12/26* (2006.01)
(52) U.S. Cl.
CPC .................................. *H04L 43/087* (2013.01)
(58) Field of Classification Search
CPC ......... H04L 1/205; H04L 7/0337; H04L 1/24; H04L 43/087; H04L 27/04; H04L 7/033; H04L 12/1886; H04L 1/00; H04L 1/244; H04L 1/248; H04L 25/068; H04L 27/362; H04L 7/0008; H04L 1/20; H04L 1/203; H04L 25/03031; H04L 25/061; H04L 27/06; H04L 43/045; H04L 43/16; H04L 7/0025; H04L 7/0037; H04L 7/0331; H04L 7/0338; H04L 12/28; H04L 12/56; H04L 1/0002; H04L 1/0047; H04L 1/0054; H04L 1/08; H04L 25/03178; H04L 25/03885; H04L 25/085; H04L 25/14; H04L 25/497; H04L 29/06; H04L 41/0681; H04L 43/10; H04L 45/50; H04L 47/11; H04L 5/1438; H04L 65/80; H04L 67/12; H04L 67/322; H04L 69/28; H04L 69/329; H04L 7/0029; H04L 7/005; H04L 7/0083; H04L 7/043; H04L 9/0863; H04L 2025/0377;
(Continued)

(56) References Cited

U.S. PATENT DOCUMENTS 7,388,937 B1 * 6/2008 Rodger .................. H04L 1/205
375/346
2003/0095304 A1 * 5/2003 Dorring .................. H04L 1/205
398/5
(Continued)

*Primary Examiner* — Kashif Siddiqui
(74) *Attorney, Agent, or Firm* — Schwabe, Williamson & Wyatt, P.C.

(57) ABSTRACT

A jitter determination method for determining at least one jitter component of a data signal is disclosed. The jitter determination method comprises the following steps:
- at least one of generating and receiving a random jitter distribution associated with a random jitter component of said data signal;
- at least one of generating and receiving a model-based deterministic jitter distribution, said model-based deterministic jitter distribution being associated with at least one deterministic jitter component of said data signal;
- at least one of determining and receiving a total jitter distribution associated with both said random jitter component and said at least one deterministic jitter component;
- determining a convolution of said random jitter distribution with said model-based deterministic jitter distribution, thereby generating a model-based total jitter distribution; and
- applying a variational method to said model-based deterministic jitter distribution in order to determine said deterministic jitter component of said data signal.

Further, a measurement instrument is described.

19 Claims, 4 Drawing Sheets

(58) Field of Classification Search
CPC ........... H04L 25/0288; H04L 25/03343; H04L 25/49; H04L 25/4908; H04L 47/225; H04L 47/2416; H04L 47/2433; H04L 47/28; H04L 63/0407; H04L 65/1069; H04L 7/0012; H04L 7/041; H04L 7/10; H04B 3/462; H04B 17/104; H04B 3/46; H04B 10/07; H04B 10/0795; H04B 10/801; H04B 15/02; H04B 17/0085; H04B 17/15; H04B 17/20; H04B 17/21; H04B 17/364; H04B 17/3912; H04B 1/00; H04B 1/713; H04B 2215/067; H04B 10/25077; H04B 17/345; H04B 3/145; H04B 3/148; H03C 3/095; H03C 3/0966; H04J 3/0641; H04J 3/0667; H04J 3/0688; H04J 14/06; H04J 14/08; H04M 1/0264; H04M 1/72577; H04M 3/38
See application file for complete search history.

(56) References Cited

U.S. PATENT DOCUMENTS

| | | | |
|---|---|---|---|
| 2003/0191592 A1* | 10/2003 | Mueller | H04L 1/24 702/69 |
| 2004/0268190 A1* | 12/2004 | Kossel | H04L 1/20 714/704 |
| 2005/0111536 A1* | 5/2005 | Cranford, Jr. | H04B 3/462 375/226 |
| 2007/0098126 A1* | 5/2007 | Tietz | H04L 1/205 375/355 |
| 2010/0107009 A1* | 4/2010 | Yamaguchi | G01R 31/31709 714/26 |
| 2010/0107020 A1* | 4/2010 | Ichiyama | G01R 29/26 714/704 |
| 2010/0246650 A1* | 9/2010 | Erb | H04L 1/205 375/224 |

* cited by examiner

JITTER DETERMINATION METHOD AND MEASUREMENT INSTRUMENT

FIELD OF THE DISCLOSURE

Embodiments of the present disclosure generally relate to a jitter determination method for determining at least one jitter component of a data signal. Further, embodiments of the present disclosure generally relate to a measurement instrument.

BACKGROUND

For a thorough jitter analysis, the components of jitter such as Data Dependent Jitter (DDJ), Periodic Jitter (PJ), Other Bounded Uncorrelated Jitter (OBUJ) and Random Jitter (RJ) must be separated.

So far, techniques are known that exclusively relate on determining the Time Interval Error (TIE) of the Total Jitter (TJ). In fact, the causes of the different jitter types lead to a distortion of the received signal and they, therefore, have an influence on the TIE via the received signal. Accordingly, the respective components of jitter are calculated based one the Time Interval Error (TIE) of the Total Jitter (TJ) determined previously.

The respective components of jitter are obtained by averaging operations. For instance, the Data Dependent Jitter (DDJ) is estimated by averaging the Time Interval Error (TIE) of the Total Jitter (TJ), namely a DDJ eye diagram or a DDJ worst case eye diagram. Moreover, certain components of jitter cannot be determined in a reliable manner.

When the total jitter component and the random jitter component of a signal are known, a deterministic jitter component may be determined by calculating a deconvolution of the random jitter and the total jitter. As the respective convolution matrices usually have a determinant near zero, pseudo-inverse matrices have to be used and/or the regularization factors have to be employed. However, signal noise is highly amplified in the process yielding in a result that is very noisy.

For instance, OBUJ is a measure for the strength of cross talk between a transmission channel transmitting a data signal and other signal channels, wherein the cross talk constitutes an uncorrelated perturbation for the data signal. In the prior art, only a peak-to-peak value of the OBUJ is estimated based on a model of the OBUJ. However, for debugging a device under test, further information about the OBUJ would be desirable.

Accordingly, there is a need for a fast and reliable possibility to determine a jitter component of a data signal, particularly the Other Bounded Uncorrelated Jitter (OBUJ).

SUMMARY

Embodiments of the present disclosure provide a jitter determination method for determining at least one jitter component of a data signal, comprising the following steps: a random jitter distribution associated with a random jitter component of said data signal is at least one of generated and received. A model-based deterministic jitter distribution is at least one of generated and received, wherein said model-based deterministic jitter distribution is associated with at least one deterministic jitter component of said data signal. A total jitter distribution associated with both said random jitter component and said at least one deterministic jitter component is at least one of determined and received. A convolution of said random jitter distribution with said model-based deterministic jitter distribution is determined, thereby generating a model-based total jitter distribution. A variational method is applied to said model-based deterministic jitter distribution in order to determine said deterministic jitter component of said data signal.

The jitter determination method according to the present disclosure is based on the rationale that the time needed for determining the deterministic jitter component can be reduced and/or the accuracy of the determined deterministic jitter component can be enhanced by applying the variational method to the model-based deterministic jitter component.

Generally speaking, the model-based deterministic jitter distribution is varied until the resulting model-based total jitter distribution is as similar as possible to the actual total jitter distribution, for instance the measured one. Thus, by varying the model-based deterministic jitter distribution, a "best match" to the actual deterministic jitter distribution is obtained.

Put differently, the convolution of the random jitter and the model-based deterministic jitter distribution is determined for several different shapes of the model-based deterministic jitter distribution and the result is compared to the actual total jitter distribution.

Thus, no deconvolution operation is needed for determining the deterministic jitter component and the disadvantages associated with such deconvolution operations are avoided. Generally, a convolution operation is computationally less demanding than a corresponding deconvolution operation. Thus, the time needed for performing the jitter determination is reduced.

The model-based deterministic jitter distribution is based on a suitable mathematical model of the deterministic jitter distribution. For example, in the case of the non-periodic bounded uncorrelated jitter, the OBUJ distribution may be modelled as two δ-function like peaks that are spaced apart by a predetermined distance.

Therein and in the following, the term "distribution" is understood to comprise the meanings "probability distribution" and "probability density". In other words, the individual jitter distributions are functions, for instance discretized functions, describing the probability of a certain time interval error occurring due to the respective jitter component. Thus, the jitter distributions may be visualized as plots of probability against time interval error.

According to one aspect of the present disclosure, a cost functional is provided, wherein the cost functional depends at least on the total jitter distribution and the model-based total jitter distribution. The cost functional provides a measure for how similar the resulting model-based total jitter distribution is to the actual total jitter distribution, and thus the cost functional also provides a measure for how closely the model-based deterministic jitter distribution resembles the actual deterministic jitter distribution.

According to a further aspect of the present disclosure, the model-based deterministic jitter distribution is varied such that the cost functional is minimized or maximized. Whether the cost functional is minimized or maximized depends on the particular definition of the cost functional, as both cases can be converted into one another by a global multiplication of the cost functional with minus one. However, the cost functional of equation may be defined such that the cost functional is to be minimized, which can be regarded as the intuitive definition of the cost functional. Generally, if the cost functional reaches its extreme value, the resulting model-based deterministic jitter distribution resembles the actual deterministic jitter distribution as closely as possible.

Without restriction of generality, the case that the cost functional is to be minimized will be considered in the following.

In one embodiment of the present disclosure, a difference between the model-based total jitter distribution and said total jitter distribution is accounted for in the variational method. Particularly, the cost functional comprises a convolution error factor comprising Euclidian distances between the individual points of the model-based total jitter distribution and the respective points on the total jitter distribution. Of course, the value of the cost functional increases with increasing distances.

In another embodiment of the present disclosure, at least one physical constraint is accounted for in the variational method. For example, the constraint may be that the model-based deterministic jitter distribution should be bigger than 0, as physical distributions are always positive. Thus, unphysical portions of the model-based deterministic jitter distribution increase the value of the cost functional and such model-based deterministic jitter distributions are suppressed.

According to another aspect of the present disclosure, the applied variational method comprises a total variation denoising method. This way, model-based deterministic jitter distributions comprising too much noise are suppressed. Put differently, smoother model-dependent deterministic jitter distribution are favored by the variational method comprising the total variation denoising method.

Particularly, a total variation factor is accounted for in the variational method. In fact, the total variation factor enters the cost functional and provides a measure for the amount of noise the model-based deterministic jitter distribution comprises. Thus, an increasing amount of noise content in the model-based deterministic jitter distribution also increases the value of the cost functional, and such model-dependent deterministic jitter distributions are suppressed.

The total variation factor may be determined based on values of the model-based deterministic jitter distribution. More precisely, the total variation factor is a measure for the total variation, i.e. the total arc length of the model-dependent deterministic jitter distribution. It has turned out that the jitter determination method according to this embodiment of the present disclosure can be performed in a particularly fast manner and that the results are particularly robust.

According to a further aspect of the present disclosure, the total variation factor is determined based on a gradient of the model-based deterministic jitter distribution. More precisely, the total variation factor is a measure for the total variation of the gradient of the model-dependent deterministic jitter distribution, i.e. the total arc length of the gradient of the model-dependent deterministic jitter distribution. It has turned out that the results achieved with the jitter determination method according to this embodiment of the present disclosure are particularly accurate, i.e. the deterministic jitter distribution can be reconstructed in a particularly accurate way.

In another embodiment of the present disclosure, said total variation factor is weighted with a regularization factor. The regularization factor plays an important role for denoising the result. Generally, lower values for the regularization factor provide lesser denoising, e.g. with the regularization factor being equal to zero there is no smoothing at all. For higher values of the regularization factor, functions with higher total variation are suppressed, but become more likely to be dissimilar to the original function. Thus, in the case at hand, the model-based deterministic jitter distribution becomes increasingly dissimilar to the deterministic jitter distribution.

The at least one deterministic jitter component may comprise a non-periodic bounded uncorrelated jitter component. The term "non-periodic bounded uncorrelated jitter" is a synonym for other bounded uncorrelated jitter (OBUJ). Thus, a jitter determination method being capable of determining the OBUJ component of the data signal in a particularly fast and/or accurate way is provided.

Embodiments of the present disclosure further provide a jitter determination method for determining at least one jitter component of a data signal, comprising the following steps: a time interval error RJ histogram associated with a random jitter component of said data signal is at least one of generated and received. A model-based time interval error mDJ histogram is at least one of generated and received, wherein said model-based mDJ histogram is associated with at least one deterministic jitter component of said data signal. A time interval error total jitter TJ histogram associated with both said random jitter component and said at least one deterministic jitter component is at least one of determined and received. A convolution of said RJ histogram with said mDJ histogram is determined, thereby generating a model-based total jitter mTJ histogram. A variational method is applied to said model-based mDJ histogram in order to determine said deterministic jitter component of said data signal.

The jitter determination method according to this embodiment of the present disclosure is based on the rationale that time needed for determining the deterministic jitter component can be reduced and/or the accuracy of the determined deterministic jitter component can be enhanced by applying the variational method to the model-based deterministic jitter component.

Generally speaking, the mDJ histogram is varied until the resulting mTJ histogram is as similar as possible to the actual TJ histogram. Thus, by varying the mDJ histogram, a "best match" to the actual DJ histogram is obtained.

Put differently, the convolution of the RJ histogram and the mDJ histogram is determined for several different shapes of the mDJ histogram and the respective result obtained is compared to the actual TJ histogram, for instance subsequently for the several different shapes.

Thus, no deconvolution operation is needed for determining the deterministic jitter component and the disadvantages associated with such deconvolution operations are avoided. Generally, a convolution operation is computationally less demanding than a corresponding deconvolution operation. Thus, the time needed for performing the jitter determination is reduced.

The mDJ histogram is based on a suitable mathematical model of the deterministic jitter distribution. For example, in the case of the non-periodic bounded uncorrelated jitter, the OBUJ histogram may be modelled as two δ-function like peaks that are spaced apart by a predetermined distance.

According to one aspect of the present disclosure, a time interval error histogram being associated with at least one of said deterministic jitter, said random jitter, said total jitter, said model-based deterministic jitter and said model-based total jitter is plotted. Thus, the result of the jitter determination method is presented to a user in a particularly easy conceivable way.

In one embodiment of the present disclosure, a time interval error histogram being associated with at least one of said deterministic jitter, said random jitter, said total jitter, said model-based deterministic jitter and said model-based total jitter is selectively plotted. Particularly, the user may choose which one or which ones of the jitter components are displayed. The simultaneous depiction of several jitter components is particularly useful for debugging a device under test.

The individual jitter distributions may be plotted in the same and/or in different diagrams.

Embodiments of the present disclosure further provide a measurement instrument, comprising at least one input channel and an analysis module being connected to the at least one input channel. The measurement instrument is configured to receive a data signal via said input channel and to forward the data signal to the analysis module. The analysis module is configured to at least one of generate and receive a random jitter distribution associated with a random jitter component of said data signal. The analysis module is configured to at least one of generate and receive a model-based deterministic jitter distribution, said model-based deterministic jitter distribution being associated with at least one deterministic jitter component of said data signal. The analysis module is configured to at least one of determine and receive a total jitter distribution associated with both said random jitter component and said at least one deterministic jitter component. The analysis module is configured to determine a convolution of said random jitter distribution with said model-based deterministic jitter distribution, thereby generating a model-based total jitter distribution. The analysis module is configured to apply a variational method to said model-based deterministic jitter distribution in order to determine said deterministic jitter component of said data signal.

The measurement instrument according to the disclosure is based on the rationale that time needed for determining the deterministic jitter component can be reduced and/or the accuracy of the determined deterministic jitter component can be enhanced by providing an analysis module being configured to apply a variational method to the model-based deterministic jitter component.

Generally speaking, the model-based deterministic jitter distribution is varied by the analysis module until the resulting model-based total jitter distribution is as similar as possible to the actual total jitter distribution. Thus, by varying the model-based deterministic jitter distribution, a "best match" to the actual deterministic jitter distribution is obtained.

Put differently, the convolution of the random jitter and the model-based deterministic jitter distribution is determined for several different shapes of the model-based deterministic jitter distribution and the result is compared to the actual total jitter distribution.

Thus, no deconvolution operation is needed for determining the deterministic jitter component and the disadvantages associated with such deconvolution operations are avoided. Generally, a convolution operation is computationally less demanding than a corresponding deconvolution operation. Thus, the time needed for performing the jitter determination is reduced.

In particular, the measurement instrument according to the disclosure is configured to perform the jitter determination method described above.

According to one aspect of the present disclosure, the analysis module is configured to apply a total variation denoising method to said model-based deterministic jitter distribution in order to determine said deterministic jitter component of said data signal. This way, model-based deterministic jitter distributions comprising too much noise are suppressed. Put differently, smoother model-dependent deterministic jitter distribution are favored by the variational method comprising the total variation denoising method.

According to a further aspect of the present disclosure, the analysis module is configured to determine a time interval error being associated with at least one of said deterministic jitter distribution, said random jitter distribution, said total jitter distribution, said model-based deterministic jitter distribution and said model-based total jitter distribution.

The measurement instrument may further comprise a display, wherein the measurement instrument is configured to plot the determined time interval error being associated with at least one of said deterministic jitter distribution, said random jitter distribution, said total jitter distribution, said model-based deterministic jitter distribution and said model-based total jitter distribution in a histogram. Thus, the result of the jitter determination method is presented to a user in a convenient way.

In another embodiment of the present disclosure, the measurement instrument is configured to selectively plot the determined time interval error being associated with at least one of said deterministic jitter distribution, said random jitter distribution, said total jitter distribution, said model-based deterministic jitter distribution and said model-based total jitter distribution. Particularly, the user of the measurement instrument may choose which one or which ones of the jitter components are displayed. The simultaneous depiction of several jitter components is particularly useful for debugging a device under test.

In general, a measurement instrument is provided that may be configured to conduct a jitter determination method as described above. The respective measurement instrument may comprise at least one input channel and an analysis module that is configured to perform the respective steps.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
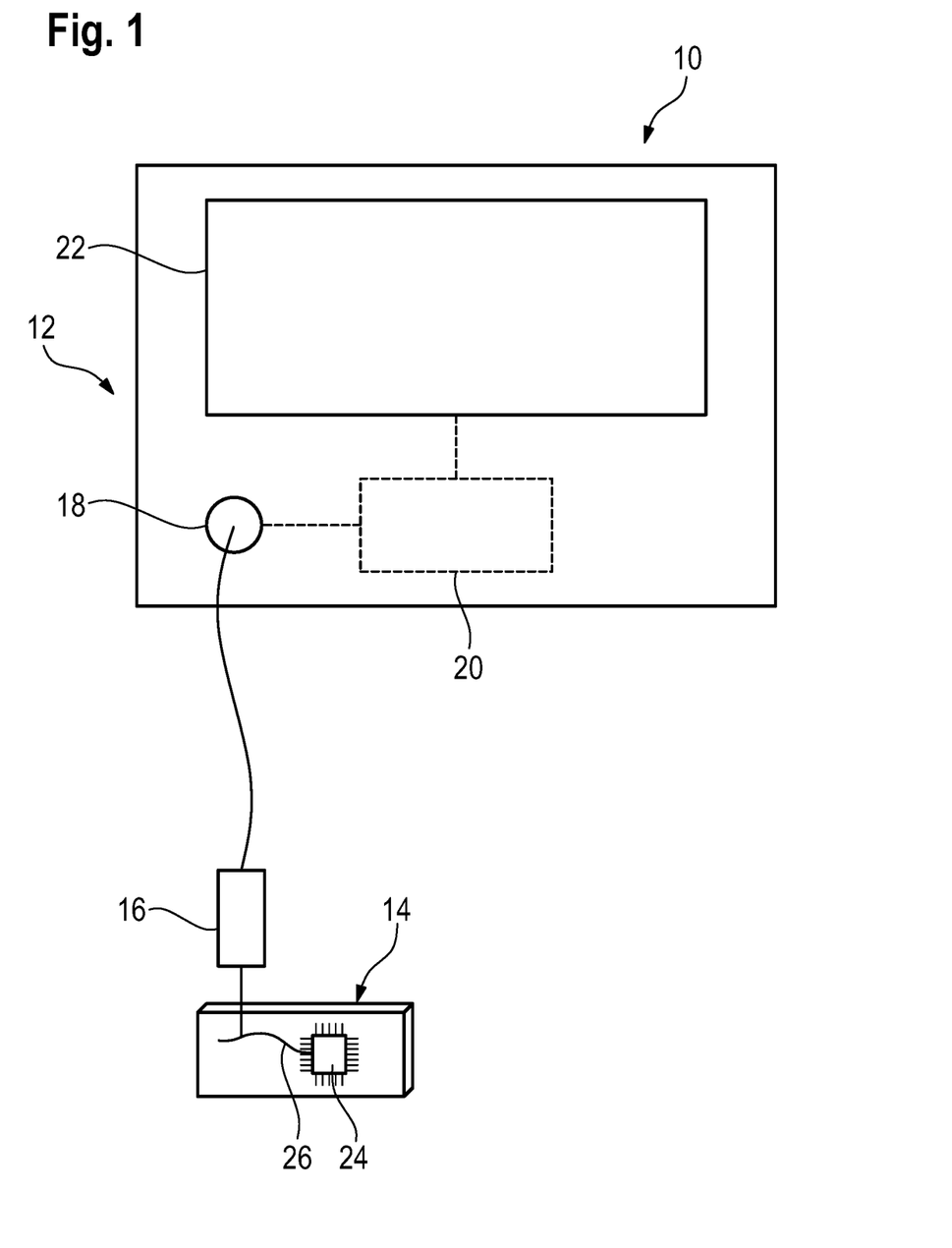
FIG. 1 schematically shows a measurement system with a measurement instrument according to the present disclosure.

FIG. 1 schematically shows a measurement system 10 comprising a measurement instrument 12 and a device under test 14. The probe 16 is connected to an input channel 18 of the measurement instrument 12, which in turn is connected to the analysis module 20.

A display 22 is connected to the analysis module 20 and/or to the input channel 18 directly.

Typically, a housing is provided that encompasses at least the analysis module 20.

Generally, the measurement instrument 12 may comprise an oscilloscope, a spectrum analyzer, a vector network analyzer or any other kind of measurement device configured to measure certain properties of the device under test 14.

The device under test 14 comprises a signal source 24 as well as a transmission channel 26 connected to the signal source 24.

In general, the signal source 24 is configured to generate an electrical signal that propagates via the transmission channel 26. In particular, the device under test 14 comprises a signal sink to which the signal generated by the signal source 24 propagates via the transmission channel 26.

More specifically, the signal source 24 generates the electrical signal that is then transmitted via the transmission channel 26 and probed by the probe 16, in particular a tip of the probe 16. In fact, the electrical signal generated by the signal source 24 is forwarded via the transmission channel 26 to a location where the probe 16, in particular its tip, can contact the device under test 14 in order to measure the electrical signal.

Thus, the electrical signal may generally be sensed between the signal source 24 and the signal sink assigned to the signal source 24, wherein the electrical signal may also be probed at the signal source 24 or the signal sink directly.

Put another way, the measurement instrument 12, particularly the analysis module 20, receives a data signal via the probe 16 that senses the electrical signal.

The data signal probed is forwarded to the analysis module 20 via the input channel 18.

The data signal is then processed and/or analyzed by the analysis module 20 in order to determine said properties of the device under test 14.

Therein and in the following, the term "data signal" is understood to be a collective term for all stages of the signal generated by the signal source 24 that exist before the signal reaches the analysis module 20. In other words, the data signal may be altered by the transmission channel 26 and/or by other components of the device under test 14 and/or of the measurement instrument 12 that process the data signal before it reaches the analysis module 20. Accordingly, the data signal relates to the signal that is received and analyzed by the analysis module 20.

The data signal usually contains perturbations in the form of total jitter (TJ) that is a perturbation in time and total noise (TN) that is a perturbation in amplitude. The total jitter and the total noise in turn each comprise several components. Note that the abbreviations introduced in parentheses will be used in the following.

Figure 2:
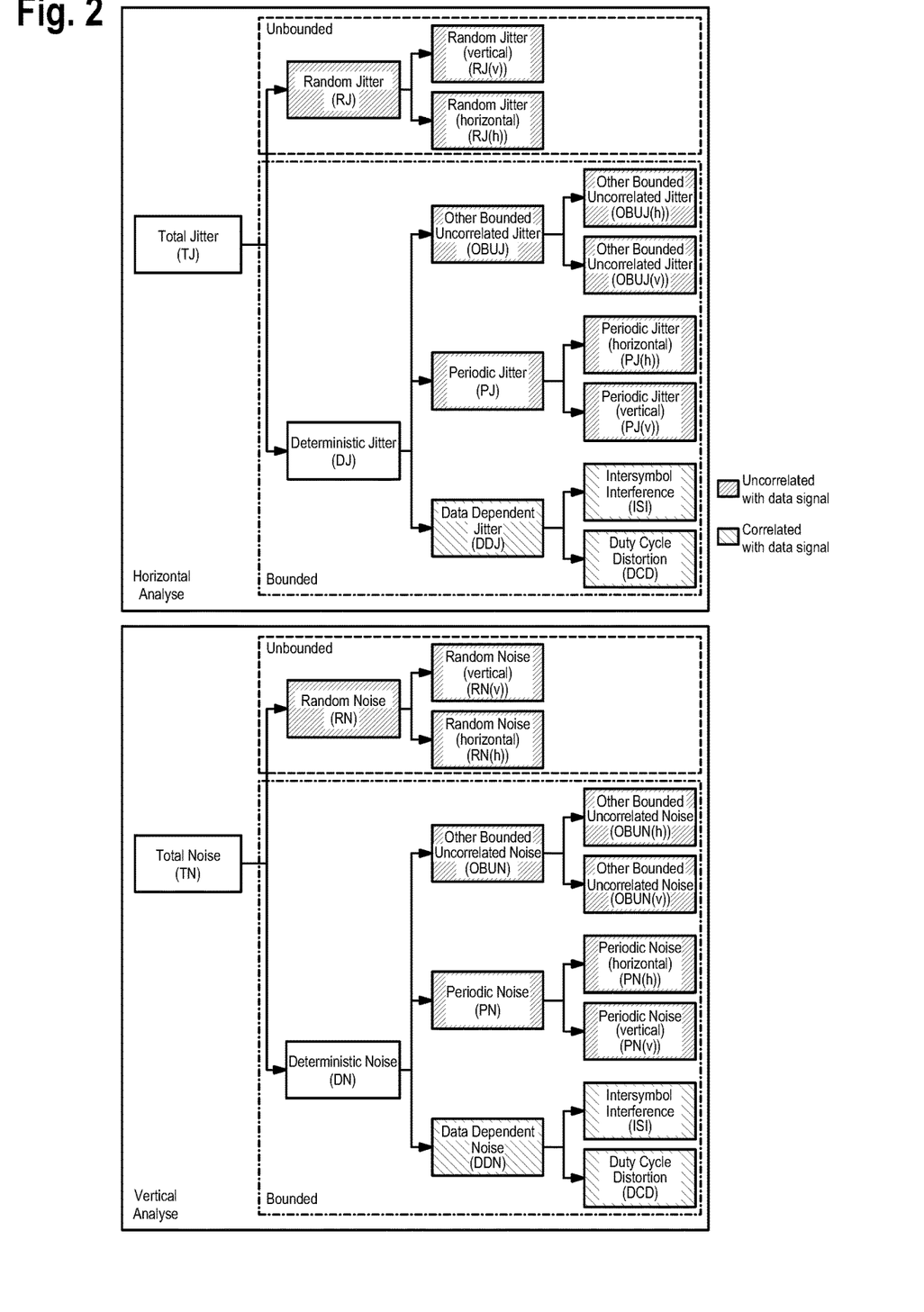
FIG. 2 shows a tree diagram of different types of jitter and different types of noise.

As is shown in FIG. 2, the total jitter (TJ) is composed of random jitter (RJ) and deterministic jitter (DJ), wherein the random jitter (RJ) is unbounded and randomly distributed, and wherein the deterministic jitter (DJ) is bounded.

The deterministic jitter (DJ) itself comprises data dependent jitter (DDJ), periodic jitter (PJ) and other bounded uncorrelated jitter (OBUJ).

The data dependent jitter is directly correlated with the data signal, in particular directly correlated with signal edges in said data signal. The periodic jitter is uncorrelated with the data signal and comprises perturbations that are periodic, particularly in time. The other bounded uncorrelated jitter comprises all deterministic perturbations that are neither correlated with the data signal nor periodic. The data dependent jitter comprises up to two components, namely inter-symbol interference (ISI) and duty cycle distortion (DCD).

Analogously, the total noise (TN) comprises random noise (RN) and deterministic noise (DN), wherein the deterministic noise contains data dependent noise (DDN), periodic noise (PN) and other bounded uncorrelated noise (OBUN).

Figure 3:
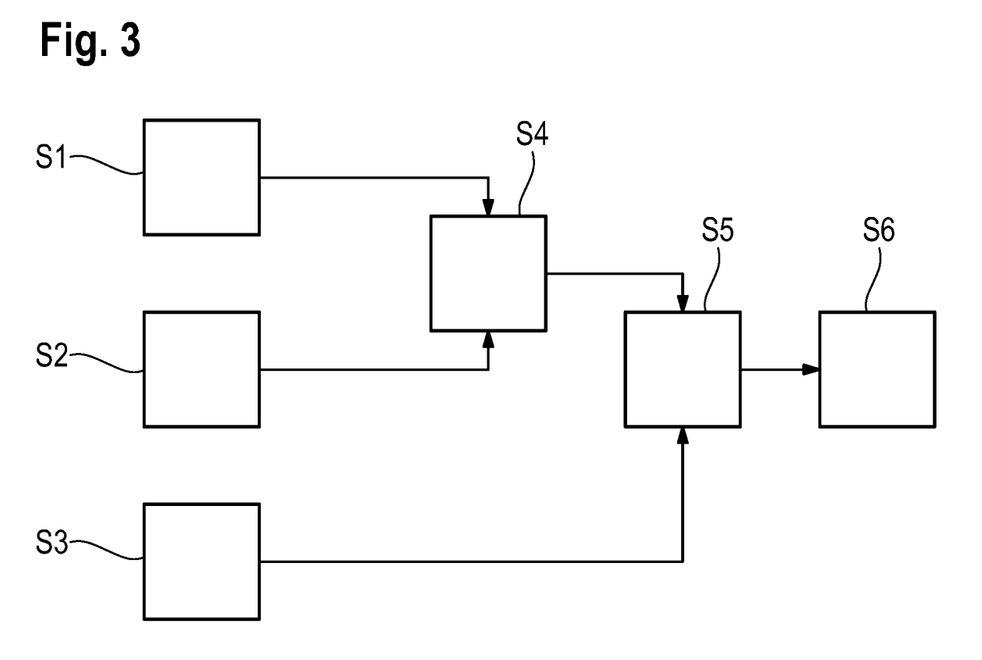
FIG. 3 shows a flow chart of a jitter determination method according to an embodiment of the present disclosure.

The measurement instrument 12 or rather the analysis module 20 is configured to perform the steps schematically shown in FIG. 3 in order to analyze one or several jitter components contained within the data signal.

Generally speaking, the measurement instrument 12 or rather the analysis 20 module is configured to determine at least one deterministic jitter component of said data signal, in particular an OBUJ component of said data signal. The OBUJ component may also be called non-periodic bounded uncorrelated jitter component.

Figure 4:
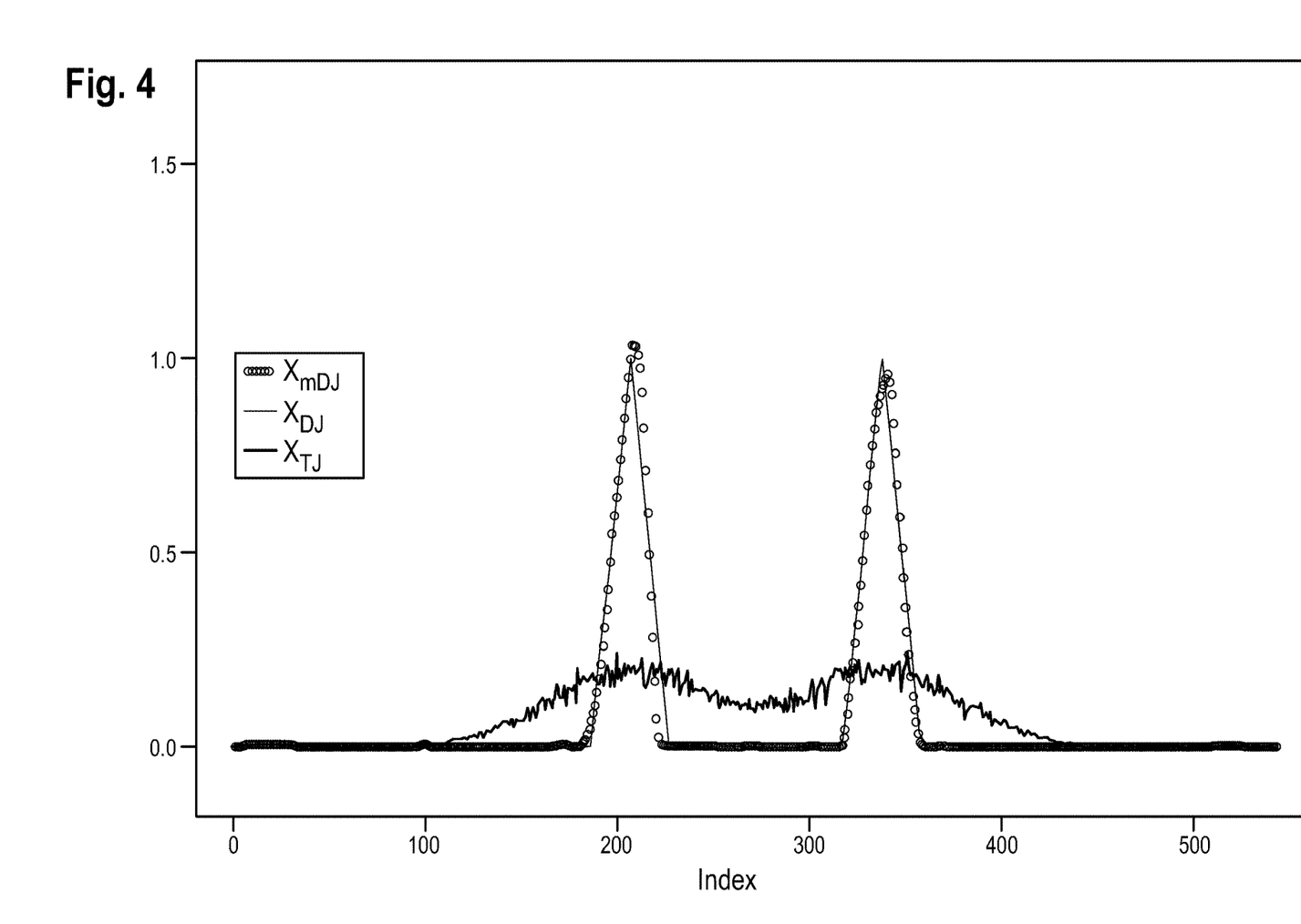
FIG. 4 shows a common plot of several jitter components.

Usually, a total jitter distribution of total jitter comprised in the data signal is a convolution of a random jitter distribution and a deterministic jitter distribution, wherein the random jitter distribution is associated with a random jitter component of the data signal, and wherein the deterministic jitter distribution is associated with a deterministic jitter distribution of the data signal. An exemplary total jitter distribution $x_{TJ}$ is depicted in FIG. 4.

Therein and in the following, the term "distribution" is understood to comprise the meanings "probability distribution" and "probability density".

In other words, the individual jitter distributions are functions, maybe discretized functions, describing the probability of a certain time interval error occurring due to the respective jitter component. Thus, the jitter distributions may be visualized as plots of probability against time interval error.

The random jitter distribution is at least one of generated and received (step S1). In other words, the random jitter distribution is determined by the analysis module 20 based on the data signal or received by the analysis module 20 from another module of the measurement instrument 12 or an external source.

Further, a model-based deterministic jitter distribution is at least one of generated and received (step S2).

The model-based deterministic jitter distribution is based on a suitable mathematical model of the deterministic jitter distribution. For example, in the case of the non-periodic bounded uncorrelated jitter, the OBUJ distribution may be modelled as two δ-function like peaks that are spaced apart by a predetermined distance.

However, any other suitable mathematical model of the respective deterministic jitter distribution may be employed.

Moreover, the total jitter distribution is at least one of determined and received (step S3). Thus, the total jitter distribution is determined by the analysis module 20 based on the data signal or received by the analysis module 20 from another module of the measurement instrument 12 or an external source.

Next, a convolution of said random jitter distribution with said model-based deterministic jitter distribution is determined (step S4). The result of the convolution of the random jitter distribution and the model-based deterministic jitter distribution is a model-based total jitter distribution.

Generally speaking, a variational method is then applied to the model-based deterministic jitter distribution in order to determine the deterministic jitter distribution (step S5).

More precisely, a total variation denoising method is applied, which will be described in more detail in the following.

A cost functional is provided that depends on both the total jitter distribution and the model-based total jitter distribution. The cost functional, symbolized by K in the following, is given by $$K = C_{err} + Z_{err} + z \cdot TV_{err}. \quad (E.1)$$

The first term, $C_{err}$, is a measure for a difference between the model-based total jitter distribution and the total jitter distribution. Particularly, $C_{err}$ comprises Euclidian distances between the individual points of the model-based total jitter distribution and the respective points on the total jitter distribution.

Thus, $C_{err}$ may somewhat symbolically be defined as $$C_{err} = \sum_i |(C \cdot x_{mDJ})_i - (x_{TJ})_i|^2, \quad (E.2)$$

wherein C is the convolution matrix describing the convolution of the random jitter distribution with the model-based deterministic jitter distribution $x_{mDJ}$, and wherein $x_{TJ}$ is the total jitter distribution. Note that $(C \cdot x_{mDJ}) \in \mathbb{R}^n$ and $x_{mDJ} \in \mathbb{R}^n$ each are n-dimensional vectors, wherein the individual components describe individual discretized slices of the respective distribution.

The second term in equation (E.1), $Z_{err}$, describes an error factor being associated with a physical constraint on the model-based distribution $x_{mDJ}$.

For example, $Z_{err}$ comprises the constraint that the model-based distribution should be bigger than 0, as physical distributions are always positive. Thus, $Z_{err}$ may be defined as $$Z_{err} = \sum_{i | x_{mDJ} < 0} (x_{mDJ}^2)_i. \quad (E.3)$$

As can be seen from the definition of $Z_{err}$ in equation (E.3), the sum runs only over portions of the model-based deterministic jitter distribution $x_{mDJ}$ that are negative, i.e. that violate the physical positivity constraint. Thus, only these portions increase the value of the cost functional K.

The third term in equation (E.1), $TV_{err}$, represents a total variation factor being associated with a total variation of the model-based deterministic jitter distribution $x_{mDJ}$.

The total variation factor $TV_{err}$ may be defined in two different ways. On one hand, the total variation factor may be defined to account for the total variation of the model-based deterministic jitter distribution, i.e.

$$TV_{err} = \sum_i |(x_{mDJ})_{i+1} - (x_{mDJ})_i|.$$

On the other hand, the total variation factor may be defined to account for the total variation of the gradient of the model-based deterministic jitter distribution, which will be symbolically denoted by $\nabla x_{mDJ}$ in the following. Thus, again somewhat symbolically, it holds $x_{mDJ} = \int \nabla x_{mDJ}$.

Accordingly, the total variation factor $TV_{err}$ may be defined as $$TV_{err} = \sum_i |(\nabla x_{mDJ})_{i+1} - (\nabla x_{mDJ})_i|.$$

In both cases, the total variation factor $TV_{err}$ is weighted with a regularization factor z that plays a role for denoising the result. Generally, lower values for the regularization factor z provide lesser denoising, e.g. for z=0 there is no smoothing at all. For higher values of z, functions with higher total variation are suppressed, but become more likely to be dissimilar to the original function, i.e. in the case described above the model-based deterministic jitter distribution becomes increasingly dissimilar to the deterministic jitter distribution.

Finally, the cost functional is minimized or maximized in order to determine the deterministic jitter distribution (step S6).

Whether the cost functional K is minimized or maximized depends on the particular definition of the cost functional, as both cases can be converted into one another by a global multiplication of the cost functional with minus one. However, the cost functional K of equation (E.1) is defined such that the cost functional is to be minimized, which can be regarded as the intuitive definition of the cost functional K.

More precisely, the model-based deterministic jitter distribution $x_{mDJ}$ is varied until the cost functional K reaches a minimum, particularly a global minimum.

The particular model-based deterministic jitter distribution $x_{mDJ}$ that minimizes the cost functional K can be regarded to closely resemble the original deterministic jitter distribution. Thus, by determining the model-based deterministic jitter distribution $x_{mDJ}$ that minimizes the cost functional K, also the deterministic jitter distribution $x_{DJ}$ is determined.

In particular, the method described above is performed for the deterministic jitter distribution being a non-periodic other bounded uncorrelated jitter distribution.

Moreover, at least one of the random jitter distribution, the model-based deterministic jitter distribution, the total jitter distribution and the model-based total jitter distribution may be selectively plotted on the display 22.

In other words, a user may decide which one or which ones of the jitter distributions are plotted on the display. Therein, the individual jitter distributions may be plotted in the same and/or in different diagrams.

The result of the jitter determination method described above is illustrated in FIG. 4. As can be seen, the determined model-based deterministic jitter distribution $x_{mDJ}$ closely resembles the shape of the original deterministic jitter distribution $x_{DJ}$. In the total jitter distribution $x_{TJ}$, however, the deterministic jitter component is barely visible due to the convolution with the random jitter component.

The jitter determination method described above may be performed with time interval error histograms being associated with the respective jitter component instead of the respective jitter distributions.

Thus, instead of the random jitter distribution a time interval error RJ histogram is employed. Instead of the model-based deterministic jitter distribution, a time interval error model deterministic jitter (m DJ) histogram is employed. Instead of the total jitter distribution, a time interval error TJ histogram is employed.

Accordingly, a convolution of the RJ histogram with the mDJ histogram is determined, thereby generating time interval error model total jitter (mTJ) histogram.

A variational method is applied to the model-based mDJ histogram in order to determine said deterministic jitter component of said data signal, analogously to the case of jitter distributions explained above.

The invention claimed is:

1. A jitter determination method for determining at least one jitter component of a data signal, comprising the following steps:
   at least one of generating and receiving a random jitter distribution associated with a random jitter component of said data signal;
   at least one of generating and receiving a model-based deterministic jitter distribution, said model-based deterministic jitter distribution being associated with at least one deterministic jitter component of said data signal;
   at least one of determining and receiving a total jitter distribution associated with both said random jitter component and said at least one deterministic jitter component;
   determining a convolution of said random jitter distribution with said model-based deterministic jitter distribution, thereby generating a model-based total jitter distribution; and
   applying a variational method to said model-based deterministic jitter distribution in order to determine said deterministic jitter component of said data signal.

2. The jitter determination method of claim 1, wherein a cost functional is provided, wherein the cost functional depends at least on the total jitter distribution and the model-based total jitter distribution.

3. The jitter determination method of claim 2, wherein the model-based deterministic jitter distribution is varied such that the cost functional is minimized or maximized.

4. The jitter determination method of claim 1, wherein a difference between the model-based total jitter distribution and said total jitter distribution is accounted for in the variational method.

5. The jitter determination method of claim 1, wherein at least one physical constraint is accounted for in the variational method.

6. The jitter determination method of claim 1, wherein the applied variational method comprises a total variation denoising method.

7. The jitter determination method of claim 6, wherein a total variation factor is accounted for in the variational method.

8. The jitter determination method of claim 6, wherein the total variation factor is determined based on values of the model-based deterministic jitter distribution.

9. The jitter determination method of claim 6, wherein the total variation factor is determined based on a gradient of the model-based deterministic jitter distribution.

10. The jitter determination method of claim 6, wherein said total variation factor is weighted with a regularization factor.

11. The jitter determination method of claim 1, wherein the at least one deterministic jitter component comprises a non-periodic bounded uncorrelated jitter component.

12. A jitter determination method for determining at least one jitter component of a data signal, comprising the following steps:
   at least one of generating and receiving a time interval error RJ histogram being associated with a random jitter component of said data signal;
   at least one of generating and receiving a model-based time interval error mDJ histogram, said model-based mDJ histogram being associated with at least one deterministic jitter component of said data signal;
   at least one of determining and receiving a time interval error total jitter TJ histogram being associated with both said random jitter component and said at least one deterministic jitter component;
   determining a convolution of said RJ histogram with said mDJ histogram, thereby generating a model-based total jitter mTJ histogram; and
   applying a variational method to said model-based mDJ histogram in order to determine said deterministic jitter component of said data signal.

13. The jitter determination method of claim 12, wherein a time interval error histogram being associated with at least one of said deterministic jitter, said random jitter, said total jitter, said model-based deterministic jitter and said model-based total jitter is plotted.

14. The jitter determination method of claim 12, wherein a time interval error histogram being associated with at least one of said deterministic jitter, said random jitter, said total jitter, said model-based deterministic jitter and said model-based total jitter is selectively plotted.

15. A measurement instrument, comprising at least one input channel and an analysis module being connected to the at least one input channel,
   the measurement instrument being configured to receive a data signal via said input channel and to forward the data signal to the analysis module,
   the analysis module being configured to at least one of generate and receive a random jitter distribution associated with a random jitter component of said data signal;
   the analysis module being configured to at least one of generate and receiving a model-based deterministic jitter distribution, said model-based deterministic jitter distribution being associated with at least one deterministic jitter component of said data signal;
   the analysis module being configured to at least one of determine and receive a total jitter distribution associated with both said random jitter component and said at least one deterministic jitter component;
   the analysis module being configured to determine a convolution of said random jitter distribution with said model-based deterministic jitter distribution, thereby generating a model-based total jitter distribution; and
   the analysis module being configured to apply a variational method to said model-based deterministic jitter distribution in order to determine said deterministic jitter component of said data signal.

16. The measurement instrument of claim 15, wherein the analysis module is configured to apply a total variation denoising method to said model-based deterministic jitter distribution in order to determine said deterministic jitter component of said data signal.

17. The measurement instrument of claim 15, wherein the analysis module is configured to determine a time interval error being associated with at least one of said deterministic jitter distribution, said random jitter distribution, said total jitter distribution, said model-based deterministic jitter distribution and said model-based total jitter distribution.

18. The measurement instrument of claim 17, further comprising a display, wherein the measurement instrument is configured to plot the determined time interval error being associated with at least one of said deterministic jitter distribution, said random jitter distribution, said total jitter distribution, said model-based deterministic jitter distribution and said model-based total jitter distribution in a histogram.

19. The measurement instrument of claim 18, wherein the measurement instrument is configured to selectively plot the determined time interval error being associated with at least one of said deterministic jitter distribution, said random jitter distribution, said total jitter distribution, said model-based deterministic jitter distribution and said model-based total jitter distribution.

* * * * *